Aug. 13, 1929.  R. R. ROOT  1,724,805
DEVICE FOR DISTRIBUTION OF POWDERY MATERIAL
Filed Sept. 23, 1922
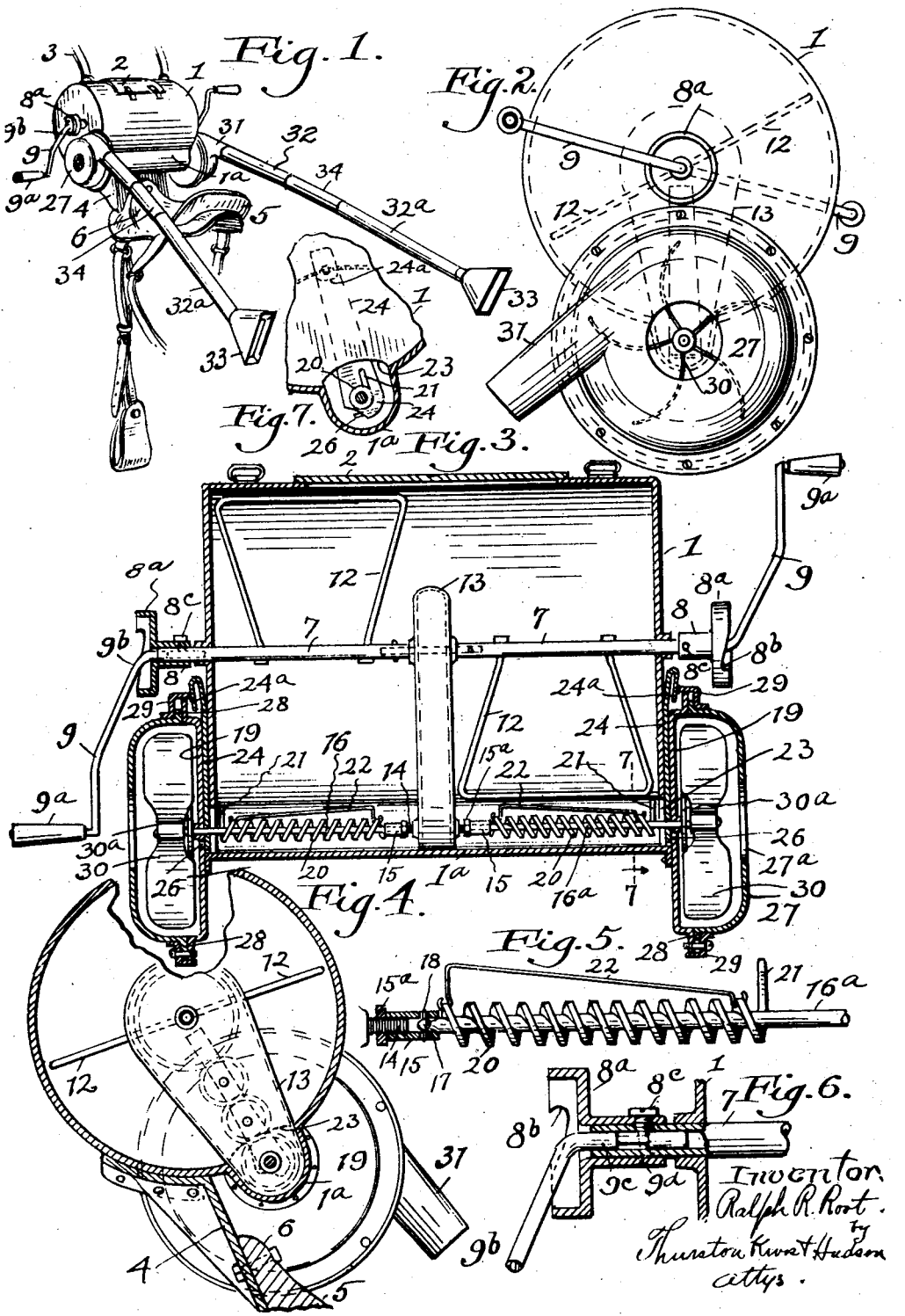

Patented Aug. 13, 1929.

1,724,805

UNITED STATES PATENT OFFICE.

RALPH R. ROOT, OF CLEVELAND, OHIO, ASSIGNOR TO THE ROOT MANUFACTURING COMPANY, OF CLEVELAND, OHIO, A CORPORATION OF OHIO.

DEVICE FOR DISTRIBUTION OF POWDERY MATERIAL.

Application filed September 23, 1922. Serial No. 590,210.

This invention relates to an apparatus adapted for insecticide distribution and has for its special object the provision of a distributor for dry powdery insecticides such as are used in cotton culture for the destruction of the boll-weevil, in potato culture for the destruction of the potato bug, and in tobacco culture for the eradication of its peculiar pest. Experience has proved that the best effects are produced by employment of dry powder dusted upon the plants while the dew is on them and that it is sufficient for most purposes to employ a comparatively small weight of insecticide per acre, if only it be uniformly and rapidly applied in a forcibly driven cloud of very fine dust. For example in the treatment of cotton against the boll-weevil, three pounds of calcium arsenate per acre when dusted uniformly and finely thereon during a dewy night is ample for one treatment, and two or three treatments per season is ample for the protection of the crop, but no machine has heretofore been produced which will distribute this material uniformly at this rate, owing to its tendency to lump, bridge, and clog. Various machines have been known which will distribute evenly an amount of from fifteen to twenty pounds per acre, but this constitutes two expensive a tax upon the grower as well as necessitating a wheeled vehicle for the transportation of so great a weight of mechanism and contents, which is impossible to use on most cotton land excepting in a peculiarly dry season.

Accordingly the objects of my invention are the provision of a device whereby calcium arsenate, lead arsenate, lime, Paris green and the like materials in dry pulverulent form can be distributed uniformly in a dust-cloud form at a regulable rate of from about one pound per acre upwardly; the provision of a device of this character wherein clogging, lumping, and bridging of the material shall be prevented regardless of atmospheric conditions; the provision of a device of this character which can either be carried directly by the operator or by saddle-animal ridden by the operator; the provision of a device of this character which can be driven by either or both hands, and wherein the height of the discharge nozzles may be adjusted for different heights of plants relatively to the apparatus; while further objects and advantages of the invention will become apparent as the description proceeds.

In the drawings accompanying and forming a part of this application I have shown one embodiment of my invention although not with the intent to limit myself to the features of design, construction, or arrangement therein illustrated. Fig. 1 is a perspective view of my improved distributor attached to a saddle; Fig. 2 is an end view, and Fig. 3 is a longitudinal section through the apparatus; Fig. 4 is a transverse sectional view through the apparatus, illustrating one mode of securing the same to a saddle horn; Fig. 5 is a detail view of the conveying and feeding mechanism; and Fig. 6 is a sectional view through one of the handle couplings. Fig. 7 is a sectional view on the line 7—7 of Fig. 3.

Describing by reference characters the parts shown in these drawings, 1 indicates the container or receptacle which is preferably of cylindrical shape and provided at one side with a hinged cover 2 and also with straps 3 whereby it may be supported from the body of the operator with its axis horizontal. I have also shown a bracket 4 whereby it may be fastened to the pommel 6 of the saddle 5, with its axis similarly horizontal.

Extending axially through this receptacle is the rotatable shaft 7 which is preferably made of tubing. At each end of the shaft 7 there is upon the end thereof a member having a sleeve 8 with a flaring cup-shaped portion $8^a$ in which there is formed a diagonal open slot $8^b$. Extending into each end of the shaft 7 is a crank member 9 which has a grip $9^a$ and a diagonal portion $9^b$ and a straight portion $9^c$ which extends within an end of the hollow shaft 7. The straight portion $9^c$ has a portion of reduced diameter, as indicated at $9^d$ with which co-operates a set screw $8^c$ that serves to fasten the sleeve 8 upon the shaft 7 and the end of the set screw extends into the portion $9^d$, thus permitting the crank to have a limited amount of movement axially with respect to the shaft 7. When the portion $9^c$ of the crank is pulled outwardly, as shown in Fig. 6, then the crank may be turned without engaging or having any operative connection with the shaft 7. On the other hand, when the portion $9^c$ is pushed inwardly then the slanting portion or diagonal portion $9^b$ of the crank will engage with the slot $8^b$ when the crank is turned in the proper direction, and under these circumstances the crank will serve to operate the shaft 7.

From the foregoing it will be seen that the shaft 7 may be operated with either or both of the cranks 9. And it will furthermore be noted that when one of the handles is released and the other operated the released handle will merely drop to its lowermost position and remain in that position and be inoperative, because the operative relation between the handles and the crank can only be effected when the crank is being used.

At the lower side of the receptacle is a longitudinal horizontal trough 1ª having openings 23, 23, at its ends; and journaled in this trough is a horizontal shaft having secured at each end a blower-fan enclosed by a fan casing with which the trough interior communicates through a regulable opening. I have shown a gear casing 13 mounted inside the container and housing a gear train whereby motion is transmitted from the shaft 7 to the spindle 14 to which the shaft sections 16, 16ª, are attached by the screw sleeves 15 and universal joints 17, 18.

Each of the sleeves 15 is adjustably mounted upon the shaft 16 so that the position of the conveyor 20 and more particularly the arm 21 which is at the end thereof, may be adjusted with respect to the exit opening 26 in the plate 19. For the purpose of securing the sleeve 15 in its adjusted position, a lock nut 15ª is provided in connection with each sleeve 15 which is threaded upon the spindle 14, this nut co-operating with the sleeve 15 to hold it in its adjusted position.

Each fan casing comprises a circular plate 19 rigidly secured to the end wall of the container and a hollow member 27 rotatably secured thereto by having its flange 28 embraced by a securing ring 29. The member 27 is formed at its center with an air inlet 27ª and at its periphery with a tangential outlet neck 31. Each of the plates 19 is formed opposite this inlet opening with an opening 26 for the passage of the insecticide, and between each plate 19 and the container 1 is mounted a controlling lever 24 having an end adapted to sweep more or less over the opening 26 to control the insecticide feed. Sufficient space is provided for this lever by displacing the plate 19 slightly from the end of the container, and similarly extending the trough 1ª. I have shown the edge of the ring 29 formed with teeth adapted to engage a rib 24ª formed on the lever to hold the same against accidental displacement.

Secured to the outer end of each of the shaft sections 16, 16ª, is a fan 30. Upon the shaft 16 and just inside of each fan 30 there is a plate member 30ª. This plate member may be loosely mounted on the shaft 16, or the construction may be such that the plate 30ª is directly attached to the fan 30 both of which constructions serve the same purpose. The function of the plate 30ª is to act as a means for preventing the incoming air which is brought in through the openings 27ª of the fan casing from coming in contact with the powdery substance which is directly issuing from the outlet opening of the casing 1, for otherwise the strong current of air impedes the free passage of this powdery material through its outlet opening, causing it to deposit on the wall, and also tends to close the outlet opening.

Secured to the portion of each of the shaft sections 16, 16ª lying inside the trough is a conveyor, which preferably takes the form of an auger screw 20, right-hand on the one side and left hand on the other so as to tend to convey the material towards the respective fan chambers. Also projecting from each shaft adjacent to and sweeping across the opening 26 is an arm 21 whose length is greater than the radius of the screw; and outside of and rotatable with said screw is a longitudinal rod or wire 22. The simplest way of making this conveyor is to wind a square wire in helical fashion and afterwards locate the same frictionally upon the respective shaft sections, leaving the projecting ends to constitute the arm 21, and fastening the rods or wires 22 to these arms; although I do not limit myself to this or other structural details. However, a conveyor of some kind is necessary to deliver the insecticide to the openings 26; an arm or whipper of some kind is necessary to expel the insecticide through this opening; and a stirring device of some kind is necessary to keep the remaining body of the insecticide from bridging over the screw or rendering the same inoperative. I preferably flare this wire 22 towards the inner end of the shaft so as to tend to catch the lint like particles which are usually found in powdery substances largely accumulated during bolting, and to cause the same to travel along the wire away from the discharge through which the powdery material is fed.

To the shaft 7 I attach one or more stirrers 12, 12, adapted to sweep across the trough and prevent any general bridging or arching thereover, and the wire 22 prevents any local bridging at the conveyor.

The arm 21 occupies a position which is practically at right angles to shaft 16 so that any lint-like material which may tend to cling thereto will be discharged from the end thereof due to centrifugal action.

Suitable spout members 32 are secured to the outlet necks 31, 31, and terminated by the spray nozzles 33, such additional tube sections 32ª and 34 being interposed as may be desirable to best position the nozzles. The rotatable mounting of the casing members 27 enables the position of this discharge to be adjusted with reference to the height of the plants and also in accordance with whether the machine is carried directly by the operator or operated from horseback. In the latter case it also permits the spouts to be moved out of the way for mounting and dismounting. Also the spout members 32, 32ᵃ and 34 may be attached at an oblique angle to each other so that upon rotation the nozzles will project at different angles.

The casing 1 having been filled with any dry powdery insecticide, the shaft 7 is turned by either or both of the handles 9, 9, thereby driving the fans at a high speed. The wires 22 chop and stir the powder while the spiral 20 advances it gradually toward the discharge opening, and the arms 21 force it through said opening in a stream which is visibly continuous, regardless of the size of the opening as determined by the position of the lever 24. This insecticide is then caught up by the air rush and delivered from the nozzles in the form of a steam-like cloud of such force as to eddy about the plant leaves and settle upon all sides of the same. In case the trough should become bridged over, the same will be broken by the wire 12 before the bridging can effect the insecticide discharge.

It will be understood that I do not restrict myself to a duplex device nor to any one method or arrangement of gearing, mounting, arrangement, design, or mechanical construction, inasmuch as modifications can be made in all such matters within the scope of the claims hereto annexed.

Having thus described my invention what I claim is:

1. In a distributor for dry insecticide, in combination, a cylindrical container having a fan chamber at each end and communicating therewith, means for supporting said container with its axis substantially horizontal, a fan in each fan chamber, a drive shaft journaled to said container, driving connections between said shaft and both said fans, means inside said container actuated by said drive shaft for feeding insecticide into said fan chambers, and a pair of cranks individually clutched to said drive shaft, one at each end.

2. In a distributor for dry insecticide, in combination, a cylindrical container having a fan chamber at each end and communicating therewith, means for supporting said container with its axis substantially horizontal, a drive shaft traversing said container lengthwise, a fan shaft journaled in the lowest part of said container and entering said fan chamber, an enclosed casing cooperating with said shafts, gearing within the casing and in part supported thereby, which gearing connects the driving shaft and fan shaft, a fan in each chamber secured to the fan shaft, means carried by the fan shaft for conveying insecticide to the respective fan chambers, and means carried by the main shaft for stirring the insecticide.

3. In a distributor for dry insecticide, in combination, a cylindrical container having a fan chamber at one end and communicating therewith, means for supporting said container with its axis substantially horizontal, two shafts journaled longitudinally of said container, one projecting into the fan chamber, a fan on said last shaft, a pair of cranks independently clutched to the other shaft, one at each end, driving connections between said shafts, and means carried by the fan shaft for conveying insecticide toward and forcing it into the fan chamber.

4. In a distributor for dry insecticide, in combination, a container having a fan chamber adjacent thereto and communicating therewith, a fan in said fan chamber, means for driving the fan, means for controlling the opening between the container and fan chamber, a conveyor arranged to deliver the insecticide toward said opening, a wiper adapted to force the insecticide through said opening, and means for breaking up the insecticide in the vicinity of said conveyor.

5. In a distributor for dry insecticide, in combination, a container, means in the container for agitating the contents thereof, a horizontal shaft in the bottom part of said container and projecting through the wall thereof, a fan chamber into which said shaft projects, a fan in said chamber secured to said shaft, there being an opening in the container wall adjacent to said shaft, a conveyor mechanism operated by said shaft adapted upon rotation of the same to move insecticide toward said opening, means for rotating said shaft, and means for breaking up the insecticide in the vicinity of said conveyor mechanism.

6. In a distributor for dry insecticide, in combination, a container, a horizontal shaft in the bottom part of said container and projecting through the wall thereof, a fan chamber into which said shaft projects, a fan in said chamber secured to said shaft, there being an opening in the container wall adjacent to said shaft, means for controlling the size of said opening, means for feeding material toward the opening and means for forcing material through said opening.

7. In a distributor for dry insecticide, in combination, a container, means in the container for agitating the contents thereof, a horizontal trough opening into the bottom thereof, a fan casing at the end of said trough and communicating therewith, a screw conveyor in said trough and having an extension which projects into the fan chamber, a fan secured to said extension inside said chamber, means for rotating said conveyor and fan, and means for breaking up the insecticide in the vicinity of said screw conveyor.

8. In a distributor for dry insecticide, in combination, a container, a horizontal trough opening into the bottom thereof, a fan casing at the end of said trough and communicating therewith, a screw conveyor in said trough, a fan in said fan casing, means for rotating both said screw-conveyor and said fan, and means for breaking up the insecticide in the vicinity of said screw-conveyor, said conveyor having a part adjacent the fan chamber to press the insecticide into said chamber.

9. In a distributor for dry insecticides, in combination, a cylindrical container, having a fan chamber at one end thereof and a horizontal trough at one side thereof communicating with said fan chamber, means for supporting said container with its axis substantially horizontal and said trough substantially at the bottom, a shaft in said trough projecting into said fan chamber, a spiral carried by said shaft inside said trough adapted to convey insecticide toward said fan chamber, means associated with the spiral for breaking up caking material in vicinity of the spiral, a drive shaft traversing said container lengthwise, a stirring arm carried by said drive shaft and sweeping over said trough, driving connections between said shafts, and a fan in said fan-chamber connected to said first shaft.

10. In a distributor for dry insecticide, in combination, a horizontal container having a fan chamber at one end, the lowest part of the container having an opening communicating with the fan chamber near the center of the latter, a plurality of horizontal shafts in said container, one of said shafts projecting into the fan chamber, a fan secured thereto, the other of said shafts carrying agitating devices driving connections between said shafts, a conveyor inside said container arranged during the rotation of said shafts to advance insecticide toward said opening, and means for breaking up said insecticide in the vicinity of said conveyor.

11. In a distributor for dry insecticide, in combination, a container having two fan chambers, one at each side, means operatively connecting said fans whereby the same are driven in unison, a crank at each side of said container, means for connecting said cranks independently in driving relation to both of said fans, and means for delivering the insecticide at a regulable rate to each of said fan chambers.

12. A distributor for dry insecticide comprising, in combination, a container having an unobstructed outlet, pneumatic distributing mechanism with which said outlet communicates, a conveyor within the container and terminating within the container adjacent the outlet, and means carried by the conveyor for preventing caking and bridging of the insecticide adjacent the conveyor.

13. A distributor for dry insecticide comprising, in combination, a container having an outlet, pneumatic distributing mechanism with which said outlet communicates, a screw-conveyor within the container adjacent the outlet, and a rod member carried by the conveyor and extending longitudinally thereof but spaced laterally therefrom so as to agitate the insecticide in the vicinity of the conveyor.

14. A distributor for dry insecticide comprising, in combination, a container having an outlet, a casing mounted upon the container with which said outlet communicates, a blower fan within said casing, means in said container for moving said insecticide through said outlet, and an outlet pipe carried by the casing, said casing being movably mounted relatively to the container.

15. A distributor for dry insecticide comprising, in combination, a container having an outlet, means for ejecting insecticide through said outlet, a casing mounted upon the container into which said outlet communicates, a blower fan within said casing, and an outlet pipe carried by said casing, said outlet pipe and casing being rotatable relatively to its mounting.

16. A distributor for dry insecticide comprising, in combination, a container having an outlet, means for expelling insecticide through said outlet, a casing mounted upon the container with which said outlet communicates, one part of said casing being flanged and the other part having a retaining ring embracing said flange to secure the parts together and permit relative rotation, a blower fan inside said casing, and an outlet pipe carried by said flanged part.

17. A distributor for dry insecticide comprising, in combination, a container having an outlet, means for expelling insecticide through said outlet, a cup-shaped casing member mounted upon the exterior of said container and defining a fan chamber, said outlet communicating with the central part of said chamber, means securing said cup-shaped casing member so as to permit it to be rotated about its own axis, a fan inside said casing member, and a tangential outlet pipe carried by said casing member.

18. A distributor for dry insecticide comprising, in combination, a container having an outlet, a shaft mounted in said container adjacent the outlet, a conveyor carried by said shaft for moving material toward the outlet, means adjacent the outlet for pushing material through the outlet, a casing carried by the container and defining a fan chamber, said outlet communicating with the interior of said fan chamber and said shaft having a portion which extends into said chamber, a fan carried by said shaft, and an outlet pipe carried by the casing.

19. A distributor for dry insecticide, comprising, in combination, a container having an outlet, a shaft within the container located adjacent the outlet, a conveyor operated by said shaft, a casing mounted upon the exterior of the conveyor and defining a fan chamber, a part of said casing being mounted so that it may turn about the chamber axis, an outlet pipe carried by such movable part, and a fan inside said casing operatively connected to said shaft.

20. A distributor for dry powdery material comprising in combination, a container having an outlet, a distributing means with which said outlet communicates, a conveyor within the container adjacent the outlet, a revoluble member associated with the conveyor which moves in a path around the conveyor axis to break up the powdery material said revoluble member being positioned in a slanting direction away from the said outlet opening in the container.

21. In a device for dispensing powdery material, the combination with a container having an outlet and distributing mechanism associated with the outlet, a conveyor within the container and ahead of the outlet, and means mounted on the conveyor for preventing caking and hanging of the material around the conveyor.

22. In a device for dispensing powdery material, the combination with a container having an outlet and distributing mechanism associated with the outlet, a conveyor within the container and ahead of the outlet, and a revolvable member associated with the conveyor which moves in a path around the axis of the conveyor to prevent caking or hanging of material.

23. In a device for dispensing powdery material, the combination with a container having an outlet and distributing mechanism associated with the outlet, a conveyor within the outlet for moving the material toward the outlet, and an arm rotatable in a plane substantially parallel with the wall in which the outlet is formed and directly co-operating with the outlet for forcing material therethrough.

24. In a device for dispensing powdery material, the combination with a container having a narrow outlet and distributing mechanism associated with the outlet, a conveyor within the container for moving material toward the outlet, and an arm rotatable in a plane substantially parallel with the wall in which the outlet is formed, which arm directly co-operates with the said outlet for forcing material through the outlet.

25. A device for dispensing powdery material, comprising a container, a conveyor within the container, and extending at approximately right angles to a wall of the container, said wall having an opening adjacent the end of said conveyor, means for forcing material received from the conveyor through said opening and a chamber into which said material is forced.

26. A device for dispensing powdery material comprising a container, a conveyor within the container and extending at approximately right angles to a wall of said container, said wall having an opening adjacent the end of the conveyor, a rotating member for forcing material received from the conveyor through the said opening and a chamber into which said material is forced.

27. A device for dispensing powdery material comprising a container, a conveyor within the container and extending at approximately right angles to a wall of said container, said wall having an opening adjacent the end of the conveyor, a member rotating in a plane parallel to and adjacent to the opening in the said wall whereby material is forced through said opening and a chamber into which said material is forced.

28. A device for dispensing powdery material comprising a container, a conveyor within the container and extending at approximately right angles to a wall of said container, said wall having an opening adjacent the end of the conveyor, a member rotating in a plane parallel to and adjacent to the opening in the said wall whereby material is forced through said opening and a chamber into which said material is forced, means associated with the conveyor to break up material around the conveyor.

29. A device for dispensing powdery material, comprising a conveyor within the container, and extending at approximately right angles to a wall of the container, said wall having an opening adjacent the end of said conveyor, means for forcing material received from the conveyor through said opening and a chamber into which said material is forced and means associated with the conveyor to break up material around the conveyor.

30. A device for dispensing powdery material comprising a container, a conveyor within the container and extending at approximately right angles to a wall of the container, said wall having a narrow opening therein, a member rotating in a plane parallel and adjacent to said opening whereby material received from the conveyor is forced through said opening and a chamber into which said material is forced.

In testimony whereof, I hereunto affix my signature.

RALPH R. ROOT.